G. MÜLLER.
SCREWED CONNECTION.
APPLICATION FILED MAR. 10, 1909.
972,211.
Patented Oct. 11, 1910.
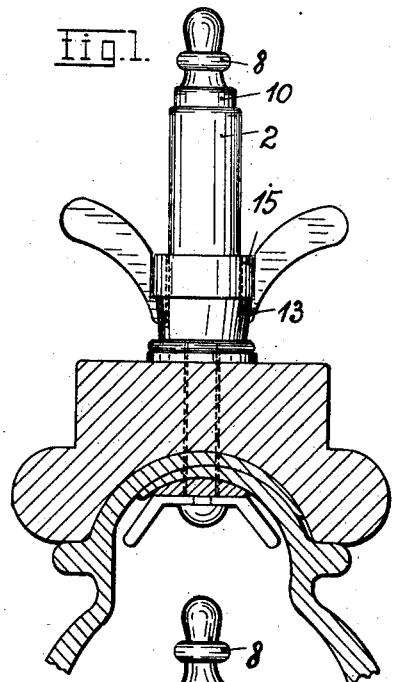
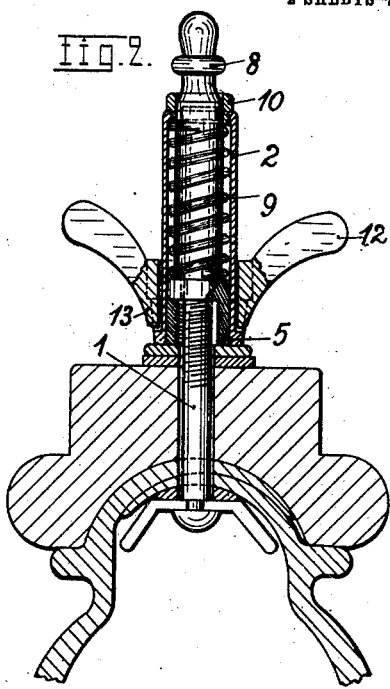
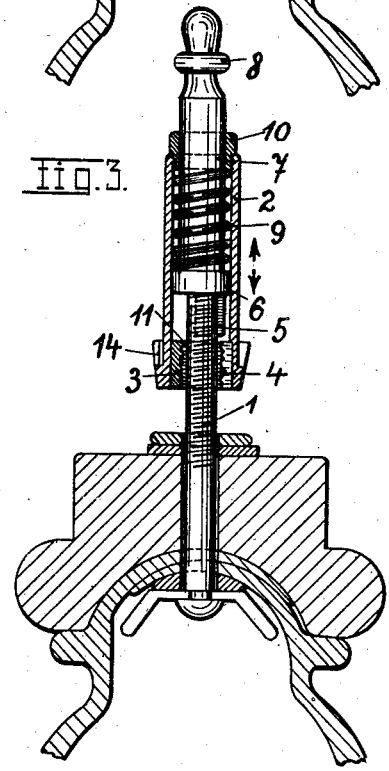
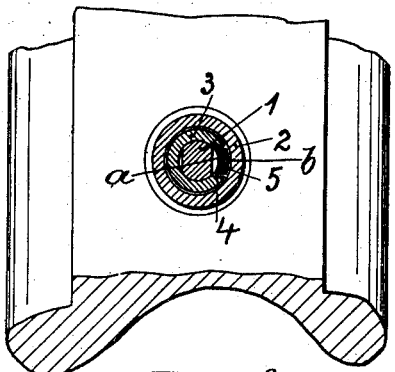
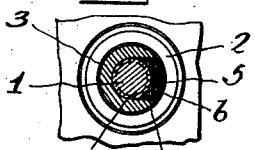
WITNESSES;
INVENTOR,
GEORG MÜLLER,
by
Attorney.

G. MÜLLER.
SCREWED CONNECTION.
APPLICATION FILED MAR. 10, 1909.
972,211.
Patented Oct. 11, 1910.
2 SHEETS—SHEET 2.
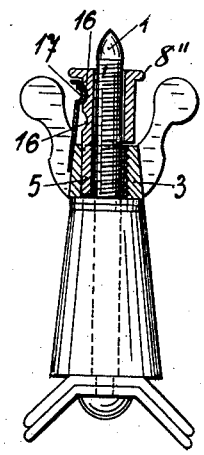
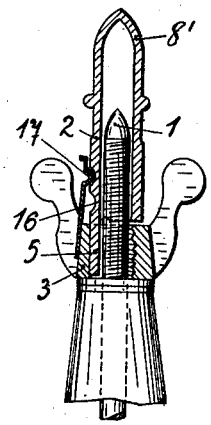
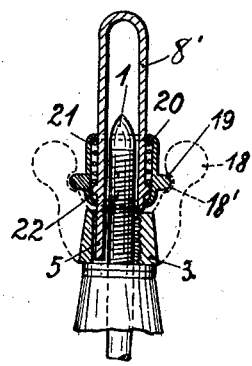
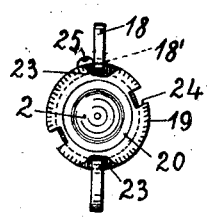
WITNESSES;
INVENTOR,
GEORG MÜLLER,
by
Attorney.

UNITED STATES PATENT OFFICE.

GEORG MÜLLER, OF GMÜND, GERMANY, ASSIGNOR TO JULIUS BLOCH, OF PFORZHEIM, AND PHILIPP RUPP, OF ELLWANGEN, GERMANY.

SCREWED CONNECTION.

972,211. Specification of Letters Patent. Patented Oct. 11, 1910.

Application filed March 10, 1909. Serial No. 482,543.

*To all whom it may concern:*

Be it known that I, GEORG MÜLLER, a subject of the German Emperor, and residing at Schwäbisch Gmünd, Würtemberg, Germany, have invented new and useful Improvements in Screwed Connections; and I do hereby declare the following to be a full, clear, and exact description of the same.

The subject-matter of my invention is a screwed connection comprising a laterally slit nut and a screw-bolt which can be inserted into the same.

The connection may be used, for example, as a sleeve or socket for placing on the pipe-sockets of hose connections, and particularly for connecting air-pump tubes with pneumatic tires, but it may also be employed for other connections which have to be made rapidly. It is distinguished from known connections by its certain action and easy manipulation, and by the screw parts being hidden so that from the outside only smooth surfaces are to be seen which, when polished or ornamented, give a pleasing appearance to the connection.

In order that the invention may be clearly understood reference will be made to the accompanying drawing in which several embodiments are represented by way of example, and in which:

Figure 1 is an elevation of the new connection showing the covering sleeve attached on the connecting screw-bolt in the closed position, and Fig. 2 is a like view, part of the device being shown in section; Fig. 3 is an elevation, partly in section, showing the covering sleeve separated from the screw thread and ready for being placed on the screw-bolt or detached from it; Fig. 4 is a horizontal section through the covering sleeve and screw-bolt and the locking device, whereas Fig. 4ª shows a modification in which the screw bolt is round, and the width of the slot in the nut correspondingly increased. Figs. 5 to 8 show three different modified constructional forms of the invention, Figs. 5 to 7 being elevations, partly in section, whereas Fig. 8 is a top plan view of the form shown in Fig. 7.

Referring to the drawings, the screw-threaded part of the connecting screw-bolt 1 may be flattened on two opposite sides, as clearly shown in Fig. 4, whereas the screw-threaded part 3 of the covering sleeve 2 is provided along its entire length with a lateral incision 4 of such breadth and depth that the flattened bolt 1, when rotated ninety degrees from the position illustrated in Fig. 4, can partially enter into the incision 4, so that the screw-threads of the bolt 1 are out of engagement with those of the sleeve 2. The incision 4 is filled by a tongue 5 located on a flange or collar 6 of the shaft 8 which extends into the upper part 7 of the sleeve 2. In the constructional form represented in Figs. 1 to 4 the shaft 8 and tongue 5 are under the action of a spiral spring 9 in the sleeve 2, said spring lying on the one hand against the collar 6 and on the other hand against the top closure 10 of the sleeve 2, and tending to press the tongue 5 downward. It is not essential to the invention that the bolt be flattened, and that form might, under certain circumstances, produce an undesirable weakening. It is for this purpose that the modification shown in Figs. 4ª and 5 to 8 has been devised. In this form none of the bolt is cut away. The slot in the nut, however, has been enlarged sufficiently to allow the bolt to be pushed over into the slot, when the threads of the bolt on the side 1 will clear those on the nut 3, when the latter is slipped off the bolt.

The manner in which the device constructed as shown in Figs. 1-4, operates is as follows: When the sleeve 2 carrying the slotted nut 3 is to be placed on the bolt 1, the shaft 8 is firstly pulled outward against the action of the spring 9 until the tongue 5 is at the same height as the shoulder 11 formed by the screwed part 3. The shaft 8 is then rotated until the tongue 5 passes out of the incision 4 and is opposite the solid part of the nut 3, i. e. the shoulder 11. If the shaft 8 is now released, the tongue 5 will rest on the shoulder 11 and be held in the released position. In this position of the tongue 5 the sleeve 2 is pushed on the bolt 1 in such manner that the flattened sides of the bolt enter the incision 4 of the slotted nut 3, so that the screw threads of the bolt and nut do not come into engagement. In order to bring these into engagement the tongue 5 is rotated so far out of its locking position, shown in Fig. 3, that it is opposite the incision 4 in the screwed part 3 and snaps into it. The tongue 5, smooth on the sides *a* and *b*, now presses the bolt over so that its threads are ready to engage those of the nut 3. The screw threads are brought into engagement, however, only when the sleeve 3 has either been pushed on completely and is then tightened by means of a specially constructed wrench or when the screwed-on sleeve is to be loosened for detaching it. The joint is tightened and loosened with the aid of a wrench formed like a wing nut which is pushed with an annular central part 15 onto the sleeve and whose projecting noses 13 are guided in incisions 14 at the lower part of the sleeve 2.

In the constructional form according to Fig. 5 the tongue 5 is on a screw-nut 8″ which is a part of the device separable from the nut 3 formed as a wing nut and provided with incisions in the screw threads. After the tongue has been placed in an incision in the screw thread the nut 8″ is locked in its position on the screw bolt 1 by means of a spring 17; the latter is attached to the nut 3 and latches in a notch 16 in the screw nut 8.

In the constructional form of the device according to Fig. 6 the screw nut 8, which is open above in the previously described form is replaced by a dust-tight cap 8′; this is a part separated from the winged nut 3 and is held in like manner by a spring 17 which catches in a notch 16 after the sleeve has been pushed over the screw bolt 1 and after the tongue 5 has passed into the incision in the nut 3.

In the constructional form of the invention illustrated in Figs. 7 and 8 the dust-cap 8′ separate from the nut 3 and having the tongue 5 is locked by means of a bayonet-joint at the wings 18 of the nut when the device is tightened. For this purpose a socket or sleeve 20, under the action of the spring 21, is pushed over the bottom part of the dust-cap provided with a collar or flange 22; the sleeve 20 on its part has a collar or flange 19 provided with incisions 23, 24 and is locked by the screw 25 in its position relatively to the dust-cap 2. For tightening the connection, after the nut 3 has been placed over the bolt 1 the dust-cap 2 is pushed over the upper part of the bolt 1 and the incisions 24 of the flange 19 are pushed along the wings 18 of the nut 3 until they arrive at the same height as the incisions 18 in the wings. After the tongue 5 has passed into the incision in the nut 3 the flange 19 is rotated so far that the incisions 24 pass out of register with the wings 18 and the flange 23 engages the latter by means of its incisions 18′ under the action of the spring 21. By rotating the winged nut 3, 18 in the one or other direction it can be tightened or loosened on the bolt 1.

I claim:

1. A screw-connection comprising a screw-threaded bolt, a nut provided with a lateral slot wide enough to receive the bolt, in combination with a tongue longitudinally displaceable in and rotatable with said nut.

2. A screw-connection comprising a screw-bolt, a nut having a lateral incision larger than the smallest diameter of the bolt, in combination with a smooth tongue longitudinally displaceable in the incision, rotatable with the nut and holding in locked condition the threads of the bolt and nut.

3. A screw-connection comprising a screw-bolt, a nut having a lateral slot larger than the smallest diameter of the bolt, in combination with a smooth tongue displaceable longitudinally in the slot, pressing the threads of the bolt and nut into engagement, and locking them when the nut is turned.

4. A screw-connection comprising a screw-bolt flattened on the side, a nut having a lateral slot wider than the smallest diameter of the bolt, a tongue displaceable longitudinally in the slot and forcing the threads on bolt and nut into engagement, substantially as set forth.

5. A screw-connection comprising a screw-bolt, a nut having a lateral slot larger than the smallest diameter of the bolt, a tongue longitudinally displaceable in the slot, and pressing the threads on bolt and nut into engagement, in combination with means attached to the nut for holding the bolt and nut in locking relation, substantially as set forth.

In testimony whereof, I have signed my name to this specification in the presence of two subscribing witnesses.

GEORG MÜLLER.

Witnesses:
KARL MÜLLER,
ALBERT GRAU.